(12) United States Patent
Shin et al.

(10) Patent No.: US 10,811,676 B2
(45) Date of Patent: Oct. 20, 2020

(54) PRECURSOR OF TRANSITION METAL OXIDE, COMPOSITE OF LITHIUM AND TRANSITION METAL OXIDE, POSITIVE ELECTRODE COMPRISING SAME, AND SECONDARY BATTERY

(71) Applicant: LG Chem, Ltd., Seoul (KR)

(72) Inventors: Ho-Suk Shin, Daejeon (KR); Byung-Chun Park, Daejeon (KR); Jae-Hyun Lee, Daejeon (KR)

(73) Assignee: LG Chem, Ltd. (KR)

( * ) Notice: Subject to any disclaimer, the term of this patent is extended or adjusted under 35 U.S.C. 154(b) by 468 days.

(21) Appl. No.: 15/516,715

(22) PCT Filed: Nov. 2, 2015

(86) PCT No.: PCT/KR2015/011662
§ 371 (c)(1),
(2) Date: Apr. 4, 2017

(87) PCT Pub. No.: WO2016/068682
PCT Pub. Date: May 6, 2016

(65) Prior Publication Data
US 2017/0294645 A1    Oct. 12, 2017

(30) Foreign Application Priority Data
Oct. 31, 2014   (KR) .................. 10-2014-0149818

(51) Int. Cl.
*H01M 4/1391* (2010.01)
*C01B 25/45* (2006.01)
(Continued)

(52) U.S. Cl.
CPC ........... *H01M 4/1391* (2013.01); *C01B 25/45* (2013.01); *C01G 33/006* (2013.01); *C01G 41/006* (2013.01); *C01G 53/006* (2013.01); *C01G 53/50* (2013.01); *H01M 4/485* (2013.01); *H01M 4/525* (2013.01); *H01M 4/5825* (2013.01);
(Continued)

(58) Field of Classification Search
CPC combination set(s) only.
See application file for complete search history.

(56) References Cited

U.S. PATENT DOCUMENTS 9,287,555 B2 * 3/2016 Niittykoski ........... H01M 4/525
2012/0043499 A1    2/2012 Shin et al.
(Continued)

FOREIGN PATENT DOCUMENTS

KR   100616475 B1    8/2006
KR   20090105868 A   10/2009
(Continued)

OTHER PUBLICATIONS

Fergus "Recent development in cathode materials for lithium ion batteries" Jour of power sources. 195 p. 939-954. [2010].*
(Continued)

*Primary Examiner* — Stephen J Yanchuk
(74) *Attorney, Agent, or Firm* — Lerner, David, Littenberg, Krumholz & Mentlik, LLP

(57) ABSTRACT

Provided is a precursor of transition metal oxide represented by chemical formula 1 below.

$Ni_aMn_bCo_{1-(a+b+c+d)}Zr_cM_d[OH_{(1-x)2-y}]A_{(y/n)}$   [Chemical formula 1]

3 Claims, 2 Drawing Sheets

(51) Int. Cl.
  *H01M 4/525* (2010.01)
  *H01M 4/58* (2010.01)
  *H01M 4/485* (2010.01)
  *C01G 53/00* (2006.01)
  *C01G 33/00* (2006.01)
  *C01G 41/00* (2006.01)
  *H01M 10/0525* (2010.01)
  *H01M 2/16* (2006.01)
  *H01M 4/86* (2006.01)

(52) U.S. Cl.
  CPC ........ *H01M 10/0525* (2013.01); *H01M 2/166* (2013.01); *H01M 2004/8689* (2013.01); *Y02T 10/7011* (2013.01)

(56) References Cited

U.S. PATENT DOCUMENTS

| | | | |
|---|---|---|---|
| 2013/0089787 A1 | 4/2013 | Nagai | |
| 2013/0101900 A1* | 4/2013 | Nagai | H01M 4/525 429/223 |
| 2014/0087263 A1 | 3/2014 | Matsumoto et al. | |
| 2014/0127582 A1* | 5/2014 | Nagai | C01G 53/42 429/223 |
| 2014/0287312 A1* | 9/2014 | Choi | H01M 4/485 429/223 |
| 2014/0346393 A1 | 11/2014 | Park et al. | |
| 2015/0090926 A1 | 4/2015 | Park et al. | |
| 2015/0188183 A1* | 7/2015 | Nagai | B60L 58/12 429/94 |

FOREIGN PATENT DOCUMENTS

| | | |
|---|---|---|
| KR | 2011-0073630 A | 6/2011 |
| KR | 20130030812 A | 3/2013 |
| KR | 20140007748 A | 1/2014 |
| KR | 20140047044 A | 4/2014 |
| KR | 101446491 B1 | 10/2014 |

OTHER PUBLICATIONS

International Search Report from PCT/KR2015/011662, dated Mar. 7, 2016.

* cited by examiner

PRECURSOR OF TRANSITION METAL OXIDE, COMPOSITE OF LITHIUM AND TRANSITION METAL OXIDE, POSITIVE ELECTRODE COMPRISING SAME, AND SECONDARY BATTERY

CROSS-REFERENCE TO RELATED APPLICATIONS

This application is a national phase entry under 35 U.S.C. § 371 of International Application No. PCT/KR2015/011662, filed Nov. 2, 2015, published in Korean, which claims priority to Korean Patent Application No. 10-2014-0149818 filed in the Republic of Korea on Oct. 31, 2014, the disclosures of which are incorporated herein by reference.

TECHNICAL FIELD

The present invention relates to a precursor of transition metal oxide, a composite of lithium and transition metal oxide, and a positive electrode and a secondary battery comprising the same, and more particularly, to a precursor of transition metal oxide with low resistance and high output, a composite of lithium and transition metal oxide, and a positive electrode and a secondary battery comprising the same.

BACKGROUND ART

Recently, there is an increasing interest in energy storage technology day by day. As the application field of energy storage technology has been extended to mobile phones, camcorders, laptop computers, and even electric cars, many efforts have been made on research and development of electrochemical devices. In this aspect, electrochemical devices gain the most attention, and among them, attention is focusing on development of secondary batteries that can be recharged, and more recently, in developing such batteries, research and development of new electrode and battery designs is being carried out to improve the capacity density and specific energy.

For a positive electrode active material of a lithium secondary battery, lithium-containing cobalt oxide ($LiCoO_2$) is primarily used, and besides, the use of lithium-containing manganese oxide such as $LiMnO_2$ with layered crystal structure and $LiMn_2O_4$ with spinel crystal structure, and lithium-containing nickel oxide ($LiNiO_2$) may be contemplated.

Among the aforesaid positive electrode active materials, $LiCoO_2$ is now being widely used because of good properties including good cycle characteristics, but its drawback is low safety and high price due to a limited resources of cobalt as a raw material. As lithium manganese oxide such as $LiMnO_2$ and $LiMn_2O_4$ uses, as a raw material, manganese that is rich sources and environment-friendly, many attention is being paid as a positive electrode active material that can replace $LiCoO_2$. However, disadvantages of lithium manganese oxide are low capacity and poor cycle characteristics.

Furthermore, lithium/nickel-based oxide such as $LiNiO_2$ is cheaper as compared to cobalt-based oxide and shows high discharging capacity when charged to 4.25V, and the reversible capacity of doped $LiNiO_2$ is close to about 200 mAh/g higher than that is the capacity (about 153 mAh/g) of $LiCoO_2$. Accordingly, though average discharge voltage and volumetric density is slightly low, commercial batteries including a $LiNiO_2$ positive electrode active material has improved energy density, and thus, recently, studies about nickel-based positive electrode active materials are being intensively made to develop high capacity batteries.

Accordingly, many earlier technologies have concentrated on improvements in properties of $LiNiO_2$-based positive electrode active materials and a process for producing $LiNiO_2$, and have proposed lithium transition metal oxides with partial nickel substitution by transition metal such as Co and Mn. However, there are still unsolved problems with high production costs of $LiNiO_2$-based positive electrode active materials, swelling caused by gas generation in batteries, low chemical stability, and high pH.

In order to solve these problems, some prior art attempted to improve the battery performance by applying a material such as LiF, $Li_2SO_4$, $Li_3PO_4$ to the surface of lithium/nickel-manganese-cobalt oxide, but in this case, the material is only positioned on the surface of lithium/nickel-manganese-cobalt oxide, causing problems; there is a limitation in exerting a desired level of effect, and an extra process to apply the material to the surface of lithium/nickel-manganese-cobalt oxide is needed.

However, despite various attempts, composite of lithium and transition metal oxide having satisfactory performance is not yet developed.

DISCLOSURE

Technical Problem

The present disclosure is designed to solve the problem, and is directed to providing a precursor including particular cation and anion, and a secondary battery with low resistance and high output, including a composite of lithium and transition metal oxide produced from the precursor.

These and other objects and advantages of the present disclosure will be apparent from the following detailed description. Furthermore, it will be easily understood that the objects and advantages of the present disclosure may be realized by the means or method set forth in the appended claims and combinations thereof.

Technical Solution

To achieve the object, according to an aspect of the present disclosure, there is provided a precursor of transition metal oxide represented by the following chemical formula 1:

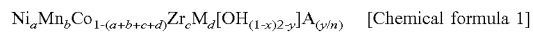

$Ni_aMn_bCo_{1-(a+b+c+d)}Zr_cM_d[OH_{(1-x)2-y}]A_{(y/n)}$ [Chemical formula 1]

wherein, M is at least one of W and Nb, A is one or more anions except OH, $0.3 \leq a \leq 0.9$, $0.05 \leq b \leq 0.5$, $0 < c < 0.05$, $0 < d < 0.05$, $a+b+c+d \leq 1$, $0 < x < 0.5$, $0 \leq y \leq 0.05$, n is the oxidation number of A.

The c:d mole ratio may be between 2:1 and 3:2 when the M is W or Nb.

The A may be at least one selected from the group consisting of $PO_4$, $CO_3$, $BO_3$, and F.

The A may include $PO_4$ and F.

The precursor of transition metal oxide may have a tap density of between 1.0 and 2.5 g/cc.

According to another aspect of the present disclosure, there is provided a composite of lithium and transition metal oxide including a result obtained from calcination of the precursor of transition metal oxide and a lithium compound.

The lithium compound may be at least one of lithium hydroxide, lithium carbonate, and lithium oxide.

The lithium compound is between 0.95 and 1.2 moles per 1 mole of the precursor of transition metal oxide.

The calcination may be performed at between 600 and 1000° C.

Further, to achieve the object, according to still another aspect of the present disclosure, there is provided a positive electrode including the composite of lithium and transition metal oxide.

In addition, according to yet another aspect of the present disclosure, there is provided a secondary battery including the positive electrode.

Advantageous Effects

The present disclosure ensures structural stability by adding a cation including zirconium to a precursor for a multicomponent-based positive electrode active material including transition metals of nickel-manganese-cobalt.

Furthermore, there are effects on resistance reduction and output improvement by including a multicomponent-based composite transition metal cation having an optimal mole ratio.

Moreover, there are benefits of additionally using a hydroxyl ion and a particular anion; a positive electrode active material having high density can be prepared, and ultimately a secondary battery having high capacity and superior life characteristics can be provided.

BRIEF DESCRIPTION OF DRAWINGS

The accompanying drawing illustrates a preferred embodiment of the present disclosure and together with the foregoing description, serves to provide further understanding of the technical spirit of the present disclosure. However, the present disclosure is not construed as being limited to the drawings.

BEST MODE FOR CARRYING OUT THE INVENTION

Figure 1:
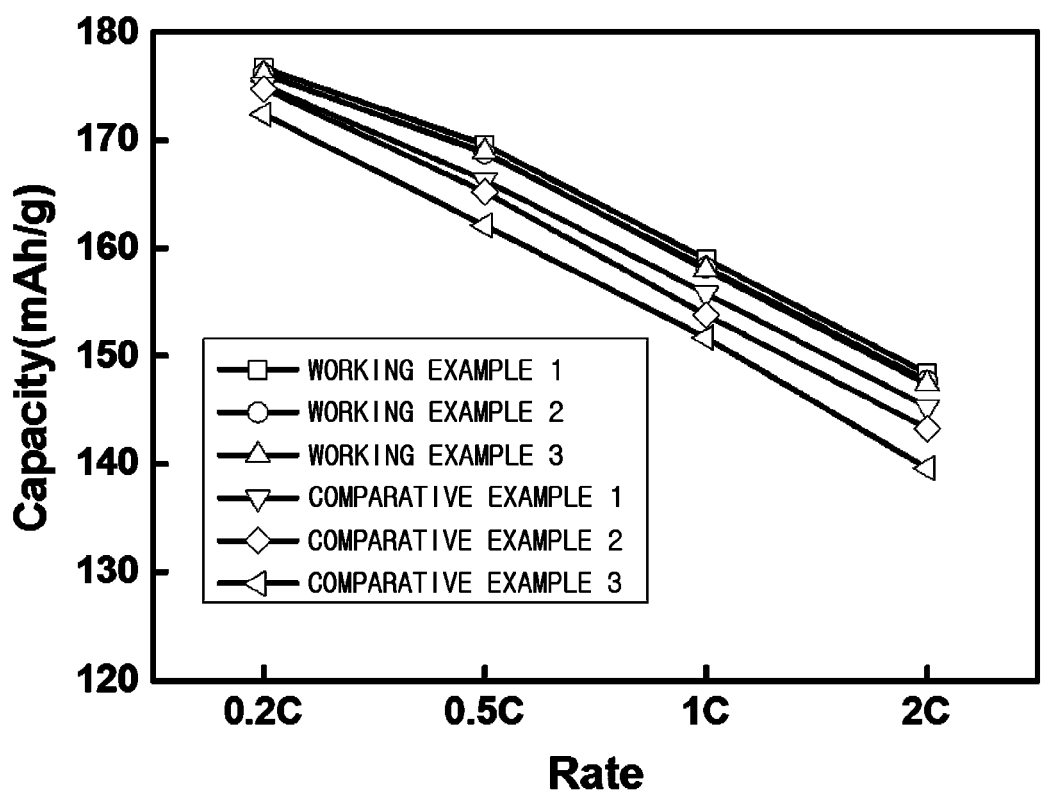
FIG. 1 is a graph showing a comparison of capacity between lithium secondary batteries fabricated in working examples and comparative examples of the present invention.

Hereinafter, the present disclosure will be described in detail. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, embodiments described in the specification and illustration shown in the drawings are just a preferable example for the purpose of illustrations only, not intended to represent all the technical aspects of the present disclosure, and it should be understood that a variety of alternative equivalents and modifications could be made thereto at the time the application is filed.

The present disclosure provides a precursor of transition metal oxide represented by the following chemical formula 1:

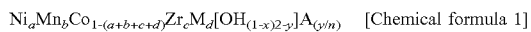   [Chemical formula 1]

wherein, M is substituted by at least one of W (tungsten), Nb (niobium), Al (aluminum), Cu (copper), Fe (iron), Mg (magnesium), B (boron), Cr (chromium) and other transition metals, and preferably one of W (tungsten) and Nb (niobium).

A is one or more anions except OH, $0.3 \leq a \leq 0.9$, $0.05 \leq b < 0.5$, $0 < c < 0.05$, $0 < d < 0.05$, $a+b+c+d \leq 1$, $0 < x < 0.5$, $0 \leq y \leq 0.05$, n is the oxidation number of A.

The precursor of transition metal oxide includes nickel in a large amount, and can be especially desirably used to prepare a positive electrode active material for high-capacity lithium secondary batteries. That is, the nickel content (a) is 0.3~0.9 as defined above, and preferably from 0.33 to 0.8 on the basis of the total amount (mole basis), namely, nickel is present in a relatively larger amount than manganese and cobalt. When the nickel content is less than 0.3, it is difficult to expect high capacity. When the nickel content is greater than 0.9, stability is greatly lowered.

Furthermore, the manganese content (b) is from 0.05 to 0.5 as defined above, and preferably from 0.1 to 0.5.

The zirconium and the metal substituent may contribute to the improvements in crystallinity due to substitution in a crystal, and the improvements in output characteristics due to the formation of a local phase having good ionic transport properties.

The sum of the zirconium content (c) and the moles (d) of metal M may be in the range greater than or equal to 0.1, and preferably may be substituted in the range greater than or equal to 0.03 and less than or equal to 0.08. When the sum of the zirconium content (c) and the moles (d) of metal M is greater than 0.1, there is high likelihood that beyond the solid-solubility limit, uniform substitution fails and precipitating phase is formed during synthesis. Furthermore, a calcination inhibitory phenomenon occurs due to an excessive amount of substituents during calcination, and possibly may degrade the properties of the positive electrode active material. On the contrary, when the sum of the zirconium content (c) and the moles (d) of metal M is less than 0.03, the effect of substitution may be almost lost.

A ratio of the zirconium content (c) and the moles (d) of metal M may be 2:1, and more preferably 3:2. When proportions of the moles (d) of metal M hold more than 50%, a strong calcination inhibitory phenomenon provides effects such as primary particle growth inhibition of the positive electrode active material, crystallinity reduction and Li by-product reduction after calcination.

The cobalt content (1-(a+b+c+d)) relies on the content (a+b+c+d) of nickel, manganese, zirconium and metal M, and when the cobalt content is too high, raw material costs increase as a whole and reversible capacity slightly reduces due to the high content of cobalt, and when the cobalt content is too low, it may be difficult to achieve sufficient rate characteristics and high powder density of batteries at the same time. Accordingly, the content (a+b+c+d) of nickel, manganese, zirconium and metal M may be preferably from 0.05 to 0.4.

Some conventional techniques to dope or surface-treat an electrode active material of lithium secondary batteries with a lithium compound including a particular anion such as $F^-$, $PO_4^{3-}$, $CO_3^{2-}$ or to mix it with a lithium compound are known. For example, some prior arts propose secondary batteries using a mixture of the known lithium/nickel-based oxide and lithium phosphate having a particular structure as an electrode active material, and some prior arts disclose preventing elution of manganese ions from an electrolyte solution by the use of lithium/manganese-based oxide coated with lithium phosphate as an electrode active material.

However, these prior arts need an extra process of surface treatment with a lithium compound after preparing an electrode active material, and such a surface treatment may lead to increased production costs of lithium secondary batteries. Furthermore, because the particular anion is present only on the surface of the electrode active material, there is a limitation in exerting a predetermined level of effect.

Accordingly, the precursor of transition metal oxide according to an embodiment of the present invention may includes $(OH_{1-x})$ alone, or preferably may include together with one or more anions substituted in a particular amount. When such a precursor of transition metal oxide including one or more anions substituted in a particular amount is used to prepare a composite of lithium and transition metal oxide, the anions may be uniformly included in the surface and inside of the composite. This feature allows a secondary battery to have superior output characteristics and life characteristics and to show high charging/discharging efficiency.

That is, the particular anion uniformly included in the surface and inside of the composite contributes to the improvement ionic conductivity between grains and induces less grain or crystal growth, reducing a structure change when oxygen is generated in an activation step and increasing the surface area, thereby improving the overall battery performance including rate characteristics.

In the chemical formula 1, the anion A ion is not limited to a particular type if it contributes to the improvement in ionic conductivity between grains.

In a preferred example, the A may be at least one selected from the group consisting of $PO_4$, $CO_3$, $BO_3$, and F, and among them, particularly, $PO_4$ and F are desirable for the increased stability of composite of lithium and transition metal oxide because of a very stable structure and a high lithium diffusion coefficient.

When the content of anion A is too high, crystallization of composite of lithium and transition metal oxide including the same is hindered, making it difficult to improve the performance of the active material, and when the content of anion A is too low, it is difficult to exert a predetermined effect, and accordingly, the content of A in the composite transition metal oxide is preferably in the range of between 0.01 and 0.05 mole on the basis of total amount (mole basis), particularly preferably greater than or equal to 0.02 and less than or equal to 0.03 mole.

For reference, the content of anion A is, of course, determined within the above range based on the oxidation number of anion as defined previously.

Because it includes the anion A, the precursor of transition metal oxide has a high tap density, and as a preferred example, may have a tap density of between 1.0 and 2.5 g/cc.

Furthermore, as the precursor of transition metal oxide is preferably prepared with an addition of the compound including the anion A in the preparation step, there is no need for an extra process for causing a reaction with a compound including anion A after preparing composite of lithium and transition metal oxide, achieving a simple and easy process and high economic efficiency. Furthermore, a lithium composite transition metal compound prepared therefrom has outstanding performance as a positive electrode active material as compared to those otherwise prepared.

Hereinafter, a method for preparing the precursor of transition metal oxide according to the present invention will be described.

The precursor of transition metal oxide may be prepared by a coprecipitation method using a basic material containing a transition metal containing salt and a compound including anion A dissolved in a particular amount.

The coprecipitation method is a preparation method for simultaneous precipitation of two or more transition metal elements in an aqueous solution using precipitation reaction. In a particular example, a composite transition metal compound including two or more transition metals may be prepared by mixing the transition metal containing salts at a desired mole ratio in consideration of the content of transition metals to prepare an aqueous solution, and by carrying out coprecipitation while maintaining an alkaline pH by addition of strong base such as sodium hydroxide, and in some cases, an additive such as an ammonia source. In this instance, it is possible to adjust a desired average particle diameter, particle diameter distribution, and particle density by appropriately controlling the temperature, pH, reaction time, slurry concentration, and ion concentration. The pH ranges from 9 to 13, preferably from 10 to 12, and in some cases, a multi-step reaction may be performed.

Preferably, the transition metal containing salt has an anion susceptible to decompose and volatilize during calcination, for example, sulfate or nitrate, and particularly, preferably sulfate. For example, nickel sulfate, cobalt sulfate, manganese sulfate, nickel nitrate, cobalt nitrate, and manganese nitrate may be available, but is not limited thereto.

The basic material includes sodium hydroxide, potassium hydroxide and lithium hydroxide, and preferably sodium hydroxide, but is not limited thereto.

Furthermore, the compound including the anion A may be represented by a chemical formula Zx'Ay', and in the formula, Z is at least one selected from the group consisting of Na, $NH_4$, and H, A is at least one selected from the group consisting of $PO_4$, $CO_3$, $BO_3$, and F, and the oxidation number of Zxx'+the oxidation number of Axy'=0 is satisfied in the range of 0<x'<4 and 0<y'<4. In a preferred example, the Zx'Ay' may be at least one selected from the group consisting of $Na_3PO_4$, $(NH_4)_3PO_4$, $(NH_4)_2HPO_4$, and $(NH_4)_2 H_2PO_4$.

The compound Zx'Ay' may be dissolved in water, and preferably, may be dissolved in the basic material as defined previously in the range of from 0.01 to 0.05 mole and introduced into a reaction tank, causing a reaction with the transition metal salt for preparing the precursor, and preferably, the compound Zx'Ay' in dissolved state may be put in a sodium hydroxide solution. In some cases, the compound Zx'Ay' may be introduced together with the transition metal containing salt.

In a preferred example, an additive and/or alkali carbonate that is capable of forming a complex with the transition metal during the coprecipitation process may be further added. The additive may be, for example, an ammonium ion source, an ethylene diamine-based compound, and a citric acid-based compound. The ammonium ion source may be, for example, ammonia water, an ammonium sulfate aqueous solution, and an ammonium nitrate aqueous solution. The alkali carbonate may be selected from the group consisting of ammonium carbonate, sodium carbonate, potassium carbonate and lithium carbonate. In some cases, these may be used in a mixture thereof.

The amount of the additive and the alkali carbonate may be appropriately determined in consideration of an amount of transition metal containing salt and pH.

Depending on the reaction conditions, a precursor of transition metal oxide including only the composite transition metal compound according to chemical formula 1 may be prepared, or a precursor of transition metal oxide including other composite transition metal compound at the same time may be prepared. For its detailed description, a reference may be made to the following embodiments.

The present disclosure further provides composite of lithium and transition metal oxide prepared from the precursor of transition metal oxide. Specifically, the precursor of transition metal oxide and a lithium containing material are brought into calcination to prepare composite of lithium and transition metal oxide which is a positive electrode active material for lithium secondary batteries, and the lithium containing material may be at least one of lithium hydroxide, lithium carbonate, and lithium oxide.

The lithium compound may be may be between 0.95 and 1.2 mole per 1 mole of the precursor of transition metal oxide, and preferably a mole ratio of between 1.0 and 1.1, and there are effects on improvements in capacity and life characteristics within the numerical range.

Furthermore, the calcination reaction is performed at the temperature of between 600 and 1000° C., preferably between 700 and 950° C., and when the calcination temperature is lower than 600° C., the precursor of transition metal oxide is not completely calcinated, and when the calcination temperature is higher than 1000° C., the precursor and the lithium compound exposed to high temperature undergo change in their properties.

When the content of anion A is too high, crystallization of composite of lithium and transition metal oxide including the same is hindered, making it difficult to improve the performance of the active material, and when the content of anion A is too low, it is difficult to exert a predetermined effect, and accordingly, the content of A in the composite transition metal oxide is preferably in the range of between 0.01 and 0.05 mole % on the basis of total amount (mole basis), particularly preferably greater than or equal to 0.02 and less than or equal to 0.03 mole %.

For reference, the content of anion A is, of course, determined within the above range based on the oxidation number of anion as defined previously.

The composite of lithium and transition metal oxide may be preferably used as an electrode active material for lithium secondary batteries, and may be used singly and in combination with other known electrode active material for lithium secondary batteries.

Furthermore, the composite of lithium and transition metal oxide includes two or more transition metals, but is not limited to, for example, a layered compound such as lithium cobalt oxide ($LiCoO_2$), lithium/nickel oxide ($LiNiO_2$) substituted by one or more transition metals; lithium manganese oxide substituted by one or more transition metals; lithium/nickel-based oxide represented by chemical formula $LiNi_{1-y}M_yO_2$ (here, M=Co, Mn, Al, Cu, Fe, Mg, B, Cr, Zn or Ga and including at least one of the elements, $0.01 \leq y \leq 0.7$) lithium/nickel cobalt manganese composite oxide represented by $Li_{1+z}Ni_bMn_cCo_{1-(b+c+d)}M_dO_{(2-e)}Ne$ (here, $-0.5 \leq z \leq 0.5$, $0.3 \leq b \leq 0.9$, $0.1 \leq c \leq 0.9$, $0 \leq d \leq 0.1$, $0 \leq e \leq 0.05$, b+c+d<1, M=Al, Mg, Cr, Ti, Si or Y, N=F, P or Cl) such as $Li_{1+z}Ni_{1/3}Co_{1/3}Mn_{1/3}O_2$, $Li_{1+z}Ni_{0.4}Mn_{0.4}CO_{0.2}O_2$.

The composite of lithium and transition metal oxide may be particularly preferably composite of lithium and transition metal oxide including Co, Ni and Mn.

A reaction condition of the precursor of transition metal oxide and the lithium containing material for preparing the composite of lithium and transition metal oxide is known in the art, and its detailed description is omitted herein.

The present disclosure further provides a positive electrode including the composite of lithium and transition metal oxide as a positive electrode active material and a lithium secondary battery including the same.

The positive electrode is manufactured, for example, by applying a mixture of the positive electrode active material according to the present disclosure, a conductive material and a binder to a positive electrode current collector and drying it, and a filler may be further added to the mixture according to needs.

The positive electrode current collector is generally manufactured with a thickness of between 3 and 500 μm. The positive electrode current collector is not limited to any particular type if it has high conductivity while not causing a chemical change to the corresponding battery, and for example, may include stainless steel, aluminum, nickel, titanium, calcinated carbon, or aluminum or stainless steel surface treated with carbon, nickel, titanium, and silver. The current collector may have its nanoscale textured surface to increase the adhesion of the positive electrode active material, and may come in various types including films, sheets, foils, nets, porous materials, foams, and nonwovens.

The conductive material is generally present in 1 to 20 weight % on the basis of the total weight of the mixture including the positive electrode active material. The conductive material is not limited to any particular type if it has conductive properties while not causing a chemical change to the corresponding battery, and includes, for example, graphite such as natural graphite or artificial graphite; carbon black such as carbon black, acetylene black, ketjen black, channel black, furnace black, lamp black, and thermal black; conductive fiber such as carbon fiber or metal fiber; metal powder such as fluoro carbon, aluminum, nickel powder; conductive whisker such as zinc oxide and potassium titanate; conductive metal oxide such as titanium oxide; and conductive materials such as polyphenylene derivatives.

The binder is a substance which aids the bond to the active material and the conductive material and the bond to the current collector, and generally, is added in an amount of between 1 and 20 weight % on the basis of the total weight of the mixture including the positive electrode active material. Examples of the binder include polyvinylidene fluoride, polyvinylalcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene ter polymer (EPDM), sulfonated EPDM, styrene butadiene rubber, fluororubber, and various copolymers.

The filler is a substance which inhibits the expansion of the positive electrode and is optionally used, and is not limited to any particular type if it is a fibrous material while not causing a chemical change to the corresponding battery, and includes, for example, olefin-based polymer such as polyethylene and polypropylene; fibrous materials such as glass fiber and carbon fiber.

The lithium secondary battery generally includes a positive electrode, a negative electrode, a separator and a lithium salt-containing nonaqueous electrolyte, and other ingredients of the lithium secondary battery according to the present disclosure will be described below.

The negative electrode is manufactured by applying a negative electrode material to a negative electrode current collector and drying it, and the ingredients as described previously may be further included according to needs.

The negative electrode material includes, for example, carbon such as non-graphitizable carbon and graphite-based carbon; metal composite oxide such as $Li_xFe_2O_3 (0 \leq x \leq 1)$, $Li_xWO_2 (0 \leq x \leq 1)$, $Sn_xMe_{1-x}Me'_yO_z$ (Me:Mn, Fe, Pb, Ge; Me': Al, B, P, Si, elements of Group 1, 2 and 3 in the periodic table, halogen; $0 \leq x \leq 1$; $1 \leq y \leq 3$; $1 \leq z \leq 8$); lithium metal; lithium alloys; silicon-based alloys; tin-based alloys; metal oxide such as SnO, $SnO_2$, PbO; conductive polymer such as polyacetylene; and Li—Co—Ni-based materials.

The negative electrode current collector is generally with a thickness of between 3 and 500 µm. The negative electrode current collector is not limited to a particular type if it has conductive properties while not causing a chemical change to the corresponding battery, and for example, may include copper, stainless steel, aluminum, nickel, titanium, calcinated carbon, copper or stainless steel surface-treated with carbon, nickel, titanium and silver, and aluminum-cadmium alloys. Furthermore, similar to the positive electrode current collector, the negative electrode current collector may have its nanoscale textured surface to increase the adhesion of the negative electrode active material, and may come in various types including films, sheets, foils, nets, porous materials, foams, and nonwovens.

The separator is interposed between the positive electrode and the negative electrode, and an insulating thin film having high ion permeability and mechanical strength is used. The pore diameter of the separator is generally 0.01~10 µm, and the thickness is generally 5~300 µm. The separator includes, for example, olefin-based polymer such as polypropylene that is chemical resistant and hydrophobic; and a sheet or a nonwoven fabric made of glass fibers or polyethylene. When a solid electrolyte of polymer is used as the electrolyte, the solid electrolyte may serve as a separator.

The lithium-containing nonaqueous electrolyte includes a nonaqueous electrolyte and a lithium salt. The nonaqueous electrolyte includes a nonaqueous electrolyte solution, a solid electrolyte, and an inorganic solid electrolyte.

The nonaqueous electrolyte solution includes, for example, aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxyfranc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

The organic solid electrolyte includes, for example, polyethylene derivatives, polyethylene oxide derivatives, polypropylene oxide derivatives, phosphoric acid ester polymer, poly agitation lysine, polyester sulfide, polyvinylalcohol, polyvinylidene fluoride, and polymer having ionic dissociable groups.

The inorganic solid electrolyte includes, for example, nitride, halide, and sulfate of Li, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$. The lithium salt is a material that is apt to dissolve in the nonaqueous electrolyte, and includes, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lithium lower aliphatic carboxylate, lithium tetraphenylborate, and imide.

Furthermore, to improve the charging/discharging characteristics and flame retardancy, for example, pyridine, triethylphosphite, triethanolamine, cyclic ether, ethylene diamine, n-glyme, triamide hexaphosphate, nitrobenzene derivatives, sulfur, quinone imine dye, N-substituted oxazolidinone, N,N-substituted imidazolidine, ethylene glycol dialkyl ether, ammonium salts, pyrrole, 2-methoxy ethanol, and aluminum trichloride may be added to the nonaqueous electrolyte. In some cases, to give non-combustibility, a halogen containing solvent such as carbon tetrachloride and trifluoroethylene may be further included, and to improve high temperature maintenance, carbon dioxide gas may be further included, and FEC (Fluoro-Ethylene Carbonate), PRS (Propene Sultone), and FPC (Fluoro-Propylene Carbonate) may be further included.

Hereinafter, embodiments will be described to describe the present disclosure in detail. However, the embodiments according to the present disclosure may be modified in many different forms, and the scope of the present disclosure should not be construed as being limited to the embodiments described below. The embodiments of the present disclosure are provided to persons having ordinary skill in the art for complete and full description of the present disclosure.

Preparation of Positive Electrode Active Material

Preparation Example 1

1.5M of metal solution was prepared using starting materials $NiSO_4$, $MnSO_4$, $CoSO_4$, and $ZrSO_4$ such that a mole ratio of Ni:Mn:Co:Zr is 60:20:19.5:0.5. Additionally, 3M of anion source was prepared using NaOH and $Na_3PO_4$ such that a ratio of OH and $PO_4$ is 1.98:0.02. With this, a precursor for a positive electrode active material was synthesized using a constant temperature continuous coprecipitation reactor of 45° C. The synthesized precursor was mixed with LiOH source at a ratio of 1:1.07, and calcination was performed in atmospheric environment at 850° C. for 10 hours to prepare a positive electrode active material.

Preparation Example 2

A positive electrode active material was prepared in the same way as preparation example 1 except that a mole ratio of Ni:Mn:Co:Zr:Nb is 60:20:19:0.6:0.4 using $ZrSO_4$ and $Nb_2(SO_4)_3$.

Preparation Example 3

A positive electrode active material was prepared in the same way as preparation example 1 except that a mole ratio of Ni:Mn:Co:Zr:W is 60:20:19:0.6:0.4 using $ZrSO_4$ and $Na_2WO_4$.

Preparation Example 4

A positive electrode active material was prepared in the same way as preparation example 1 except that a mole ratio of Ni:Mn:Co is 60:20:20 using raw materials $NiSO_4$, $MnSO_4$, and $CoSO_4$.

Preparation Example 5

A positive electrode active material was prepared in the same way as preparation example 1 except that a mole ratio of Ni:Mn:Co:Zr:W is 60:20:19.8:0.1:0.1 using $ZrSO_4$ and $Na_2WO_4$.

Preparation Example 6

A positive electrode active material was prepared in the same way as preparation example 1 except that a mole ratio of Ni:Mn:Co:Zr:W is 60:20:18:0.8:1.2 using $ZrSO_4$ and $Na_2WO_4$.

Fabrication of Secondary Battery

Working Example 1

Fabrication of Negative Electrode 96 parts by weight of artificial graphite as a negative electrode active material, 3 parts by weight of polyvinylidene fluoride (PVdF) as a binder polymer, and 1 part by weight of carbon black as a conductive material were added to N-methyl-2 pyrrolidone (NMP) solvent to prepare a mixed negative electrode slurry. The mixed negative electrode slurry was coated on the two surfaces of a 10 μm thick copper (Cu) thin film for a negative electrode current collector, followed by drying and roll pressing, to fabricate a negative electrode.

Fabrication of Positive Electrode 92 parts by weight of the positive electrode active material of preparation example 1, 4 parts by weight of carbon black as a conductive material, and 4 parts by weight of polyvinylidene fluoride (PVDF) as a binder polymer were added to N-methyl-2 pyrrolidone (NMP) solvent to prepare a mixed positive electrode slurry. The mixed positive electrode slurry was coated on the two surfaces of a 20 μm thick aluminum (Al) thin film for a positive electrode current collector, followed by drying and roll pressing, to fabricate a positive electrode.

Fabrication of Separator

Polyvinylidene fluoride (PVdF) was dissolved in acetone to prepare a binder polymer solution. Alumina ($Al_2O_3$) was added to the prepared binder polymer solution at a weight ratio of polyvinylidene fluoride/alumina($Al_2O_3$)=7.15/92.5, and alumina ($Al_2O_3$) was milled and dispersed for 3 hours or longer using a ball mill method to prepare a slurry. The particle size of alumina ($Al_2O_3$) in the prepared slurry may be controlled based on the size of beads used in the ball mill (particle size distribution) and the ball mill time, but the slurry was prepared by milling to achieve the particle size of about 400 mm in working example 1. The slurry prepared as above was coated and dried on one surface of a 12 μm thick polyethylene porous polymer film (porosity 45%).

Fabrication of Battery

The negative electrode and the positive electrode fabricated as above were stacked using a first separator interposed therebetween in the order of positive electrode/separator/negative electrode/separator/positive electrode, and the pressure was applied at high temperature to fabricate a unit bicell. 21 unit bicells fabricated as above were arranged on one surface of a second separator fabricated as above and folded to make an electrode assembly, and an electrolyte solution containing 1M of lithiumhexaflorophosphate ($LiPF_6$) dissolved in ethylene carbonate and ethylmethyl carbonate (EC/EMC=1:2, volume ratio) was injected into the assembled battery to fabricate a lithium secondary battery.

Working Example 2

A lithium secondary battery was fabricated in the same way as working example 1 except that the positive electrode active material of preparation example 2 was used.

Working Example 3

A lithium secondary battery was fabricated in the same way as working example 1 except that the positive electrode active material of preparation example 3 was used.

Comparative Example 1

A lithium secondary battery was fabricated in the same way as working example 1 except that the positive electrode active material of preparation example 4 was used.

Comparative Example 2

A lithium secondary battery was fabricated in the same way as working example 1 except that the positive electrode active material of preparation example 5 was used.

Comparative Example 3

A lithium secondary battery was fabricated in the same way as working example 1 except that the positive electrode active material of preparation example 6 was used.

TABLE 1

| | 4.3 V(coin half cell, 0.2 C/0.2 C) | | |
| --- | --- | --- | --- |
| Classification | Charge (mAh/g) | Discharge (mAh/g) | effect (%) |
| Working example 1 | 202.5 | 176.7 | 87.3 |
| Working example 2 | 202.1 | 176.2 | 87.2 |
| Working example 3 | 201.9 | 176.1 | 87.2 |
| Comparative example 1 | 201.7 | 175.1 | 86.8 |
| Comparative example 2 | 201.8 | 174.8 | 86.6 |
| Comparative example 3 | 199.4 | 172.4 | 86.5 |

Table 1 shows comparisons of charging/discharging efficiency of working examples 1 to 3 and comparative example 1 to 3.

Figure 2:
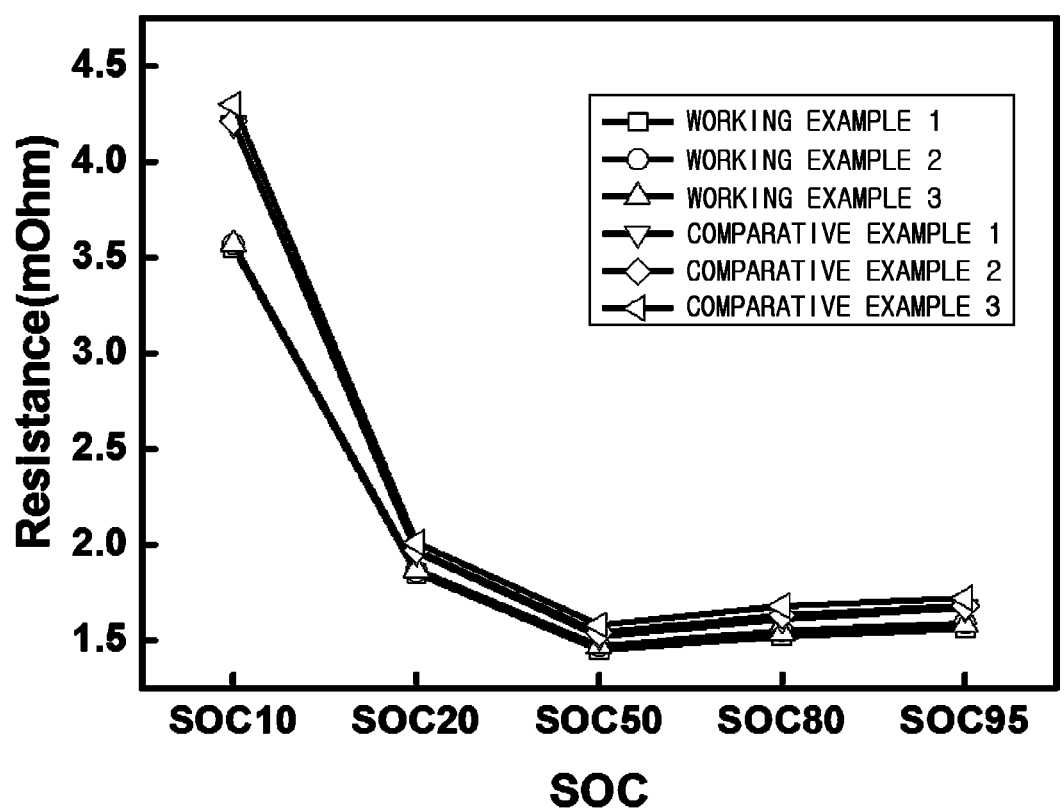
FIG. 2 is a graph showing a comparison of resistance between lithium secondary batteries fabricated in working examples and comparative examples of the present invention.

FIG. 1 is a graph showing comparisons of capacity of working examples 1 to 3 and comparative examples 1 to 3, and FIG. 2 is a graph showing comparisons of resistance of working examples 1 to 3 and comparative examples 1 to 3.

As can be seen from Table 1, and FIGS. 1 and 2, in accordance with the present invention, an optimal mole ratio of zirconium is included in the precursor for the multicomponent-based positive electrode active material including transition metals of nickel-manganese-cobalt, thereby providing superior charging/discharging efficiency, high capacity and improved output resulting from resistance reduction.

While the present disclosure has been hereinabove described with respect to the limited number of embodiments and drawings, the present disclosure is not limited thereto, and it is obvious that various modifications and changes can be made by persons having ordinary skill in the technical field to which the present disclosure pertains within the technical spirit of the present disclosure and the scope of equivalents to the appended claims.

What is claimed is:

1. A precursor of transition metal oxide represented by the following chemical formula 1:

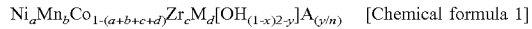  [Chemical formula 1]

$Ni_aMn_bCo_{1-(a+b+c+d)}Zr_cM_d[OH_{(1-x)2-y}]A_{(y/n)}$ wherein, M is at least one of W and Nb, A is one or more anions except OH, $0.3 \leq a \leq 0.9$, $0.05 \leq b \leq 0.5$, $0 < c < 0.05$, $0 < d < 0.05$, $a+b+c+d \leq 1$, $0 < x < 0.5$, $0 \leq y \leq 0.05$, n is the oxidation number of A, wherein c:d mole ratio is between 2:1 and 3:2 when the M is W or Nb, and the A is at least one selected from the group consisting of $PO_4$, $CO_3$, $BO_3$, and F.

2. The precursor of transition metal oxide according to claim 1, wherein the A includes $PO_4$ and F.

3. The precursor of transition metal oxide according to claim 1, wherein the precursor of transition metal oxide has a tap density of between 1.0 and 2.5 g/cc.

* * * * *